May 30, 1939.  A. E. SUTHERLAND  2,160,524
TRACK LEVELING DEVICE FOR FARM TRACTORS
Filed Dec. 3, 1937
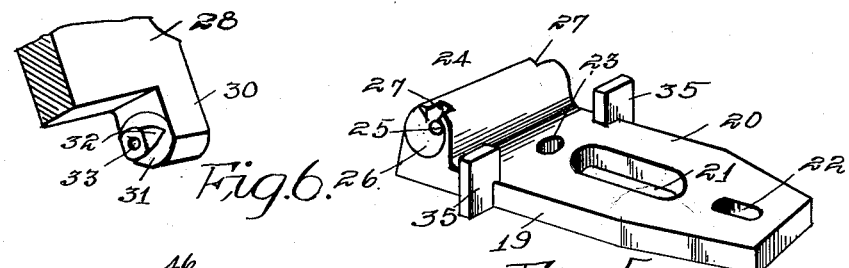
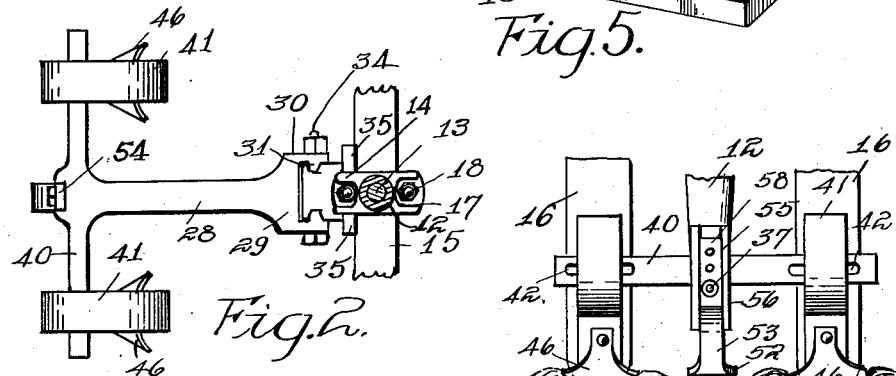
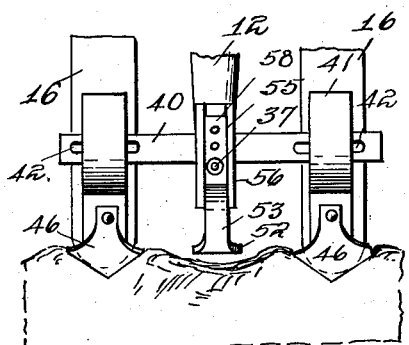
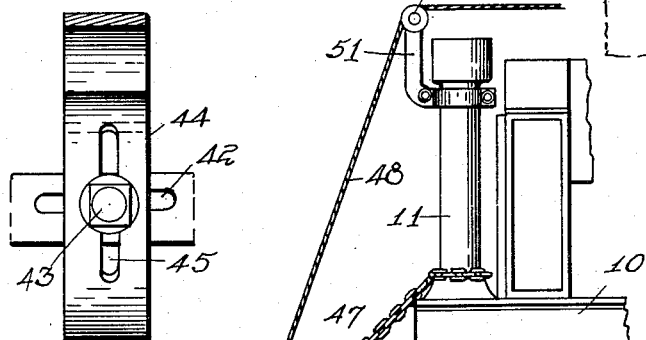
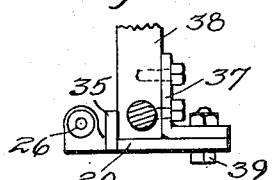
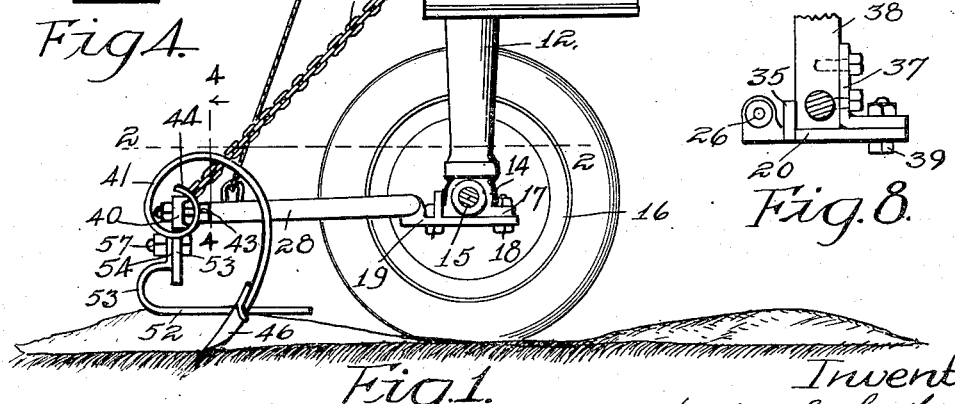
Inventor
Andrew E. Sutherland Patented May 30, 1939

2,160,524

UNITED STATES PATENT OFFICE 2,160,524

TRACK LEVELING DEVICE FOR FARM TRACTORS

Andrew E. Sutherland, Madrid, Iowa

Application December 3, 1937, Serial No. 177,874

5 Claims. (Cl. 97—47)

This invention relates to an attachment for light farm tractors, and particularly that type used for the cultivation of growing plants, such as corn, cotton, etc. This type of modern tractor is usually equipped with one or two steering wheels supported on an axle mounted to swing about a vertical axis for steering purposes and to pass between the adjacent rows of plants. These steering wheels are usually equipped with pneumatic tires which are very efficient when operated over comparatively smooth and even surfaces. An objectionable bouncing of the front end of the tractor takes place, however, when the tractor is operated over hilled cross plowing, to such an extent that steering is difficult and the riding of the tractor is very uncomfortable.

It is, therefore, the object of my invention to provide means of simple construction that may be easily and quickly attached to the steering axle and to be guided therewith for leveling the ground surface ahead of each of the steering wheels as the tractor is advanced, to form comparatively smooth paths for said wheels to travel over and thus eliminate the undesirable bouncing effect.

More specifically it is the object of my invention to provide a detachable bracket which may be secured to the steering axle and arranged to support a forwardly extending arm pivotally mounted so that the forward end of the arm is free to be elevated and lowered, and to provide on the forward end of said arm one or more earth-leveling tools arranged to cut off or level the high points of the earth's surface immediately ahead of the steering wheel or wheels, and in connection therewith, means for elevating and holding the leveling tools out of operative relation with the ground surface and also so as to not interfere with the guiding of the tractor when turning at the end of the field.

A further object is to provide in connection with a device of the class above described, means for automatically regulating the depth of the leveling tools.

A further object of my invention is to provide in connection with a track leveling device for the steering wheels of a tractor, an improved bracket for detachably connecting the device to the steering axle which is particularly adapted to fit a number of steering axles of different shapes and forms such as accompany tractors of various makes.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of the front end of a tractor showing one of the steering wheels removed, and the manner in which my improved device is connected thereto.

Figure 2 is a detail sectional view taken on the line 2—2 of Figure 1.

Figure 3 is a front elevation of Figure 2.

Figure 4 is an enlarged detail sectional view taken on the line 4—4 of Figure 1 showing the manner in which the tool supporting shank is adjustably connected to its supporting arm.

Figure 5 is a perspective view of my novel bracket by means of which the device is connected to the various types of tractors.

Figure 6 is a detail perspective view of one of the pivot elements of the tool supporting arm.

Figure 7 is a diagrammatical view showing the manner in which my improved bracket may be attached to one type of tractor axle.

Figure 8 is a diagrammatical view showing the manner in which said bracket may be attached to another type of tractor axle.

In the drawing I have used the reference numeral 10 to indicate the tractor frame having supported at its front end an upright steering post 11 of ordinary construction; said frame also being provided with a downwardly extended steering post 12. A vertically arranged steering shaft 13 is mounted in said supports 11 and 12 and has provided at its lower end a head 14 supporting the steering axle 15, said axle 15 supporting the steering wheels 16, which are of ordinary construction. The head 14 is provided with forwardly and rearwardly extending lugs 17, having openings for receiving bolts 18. These lugs 17 are furnished with the tractor equipment for the purpose of supporting auxiliary attachments such as wheel scrapers and the like. Thus, means is provided for supporting my improved bracket 19, said bracket comprising a flat body portion 20 having a longitudinal slot 21 in its central portion and a short slot 22 near its rear end. The body is also provided with an opening 23 near its front end; the front end of the body 20 being provided with a transversely arranged rib or cylindrical portion 24 having a hole 25 extending longitudinally therethrough. Each end of the member 24 is provided with a conical recess 26, the upper side of each end of the member 24 also being provided with notches 27. The member 24 is designed to support one end of a tool supporting arm 28, having its rear end provided with an enlarged portion or yoke 29, the back end of the member 29 being provided with rearwardly extending portions 30, the inner surface of each portion 30 being provided with a conical lug 31 adapted to be pivotally supported in the recess 26, the opposite sides of the inner end of the lugs 31 being flattened at 32 and adapted to enter the notches 27 when the member 28 is supported perpendicular to the plane of the body 20, thus allowing the conical lugs 31 to enter the recess 26. The arm 28 may then be swung to a horizontal position, at which time the lugs 31 will be locked in the said recess. The lugs 31 are provided with openings 33 which are in alinement with the opening 25 when the device is assembled. A small bolt 34 is then inserted through the openings 33 and 25 to strengthen the members 30 and to prevent accidental disconnection of the members 20 and 28 when the arm 28 is in its elevated and folded position. By this construction the member 20 and the arm 28 may be formed of cast metal, and a comparatively rigid pivot member will thus be formed with a comparatively small amount of work. The body 20 is also provided with upwardly extending lugs 35 adapted to assist in anchoring the body 20 against movement when the same is secured to the steering axle. When the member 20 is secured to the head 14 the front lug 17 is inserted between the lugs 35 and one of the bolts 18 passes through the opening 23, while the other bolt 18 is passed through the opening 22, thus providing means for rigidly securing the bracket to the steering axle, the lugs 35 resting against the outer edges of the front lug 17. In that type of tractor axle illustrated in Figure 7 the axle is provided with a vertically arranged bolt 36, which is passed through the slot 21 of the member 20, thus providing means for rigidly holding the bracket to that particular type of axle.

In Figure 8 an auxiliary angle iron 37 is provided which is bolted to the back side of the steering post 38 to which the member 20 is secured by means of a bolt 39 projecting through the opening 22 and the said bracket 37, as clearly illustrated.

The forward end of the arm 28 is provided with a cross arm 40 for supporting the spring shanks 41, each end of the arm 40 being provided with a slot 42 for receiving a bolt 43 by means of which the said shank may be secured in position, the upper end of the shank terminating in a convolute portion 44 having its inner surface resting against the corners of the arm 40, as clearly illustrated in Figure 1. Each of the portions 44 is also provided with a slot 45 through which the said bolt 43 extends. This slot 45 provides means whereby the shank may be rotated slightly about the longitudinal axis of the arm 40, while the slots 42 provide means whereby the shanks may be adjusted toward and from each other. The lower end of each of the shanks is provided with a cutting or leveling tool 46, preferably in the shape of a blunt cultivator shovel.

The shanks 41 are adjusted so that the cutters 46 travel immediately ahead of the corresponding wheels 16. The forward end of the arm 28 is held against downward movement by means of a flexible chain 47, having one end connected to said arm and the other end wrapped around the steering support 11, said chain being adjustably connected thereto so that the forward end of the arm 28 will be supported in fixed relation with the frame 10 so that the earth's surface as leveled by the cutters will be parallel with the said frame member 10. The chain provides means whereby the forward end of the member 28 may be easily elevated to a substantially vertical position, which is accomplished by means of a cable 48, having one end connected to an eye-bolt 49 and the other end passed over a pulley 50 carried by a bracket 51 detachably mounted on the member 11, the cable 48 being carried to the rear end of the tractor and connected to any desired point.

In order to prevent the cutters 46 from gouging and cutting too deep at such times as when the front end of the tractor is entering a ditch or ravine, I have provided a shoe 52 which is adapted to travel between the cutters 46 and has at its forward end a curved portion 53 terminating in a vertical portion 54, said vertical portion 54 being adjustably mounted on a vertically arranged lug 55 carried by the arm 28, said lug 55 having flanges 56 for guiding the member 54, the said member being secured in position by means of a bolt 57 adapted to enter into one of the openings 58. Thus means is provided whereby the shoe may also be adjusted relative to the member 28 and to prevent gouging at such times as the tractor is entering ravines or ditches.

Thus it will be seen I have provided a device of simple, durable and inexpensive construction which may be easily and quickly attached to tractors of various types without altering the steering axle, and when so attached I have provided means whereby the earth's surface ahead of the tractor wheels will be leveled so as to permit the said tractor wheels to travel on comparatively even surfaces and the undesirable bouncing effect eliminated.

I claim as my invention:

1. The combination of a tractor frame, a steering axle including steering wheels therefor, a bracket detachably secured to the center of said axle, an arm having one end pivotally connected to said bracket and its free end extending forwardly thereof to swing upwardly and downwardly, means carried by said tractor frame for limiting the downward movement of the free end of said arm, a cross arm carried by said arm, a convolute spring shank secured to each end of said cross arm, and an earth leveling tool on the lower end of each shank, each tool being supported in front of its corresponding steering wheels.

2. In a device of the class described, a bracket comprising a flat body portion provided with a head portion at one end, having its ends provided with conical recesses and transverse notches connected with said recesses, an arm having a yoke formed on one end, the inner edges of the legs of said yoke being each provided with a conical pivot member adapted to fit and operate in a corresponding recess and having their opposite sides flattened near their apex ends to enter the notches of said recesses as the head is assembled, a bolt extending through said head and said conical pivots, and an earth leveling tool supported from the free end of said arm.

3. The combination of a tractor frame, a steering axle including a bracket secured to said axle, comprising a flat body portion provided with a head portion at one end having its ends provided with conical recesses and transverse notches connected with said recesses, an arm having a yoke formed on one end, the inner edges of the legs of said yoke being each provided with a conical pivot member adapted to fit and operate in a corresponding recess and having their opposite sides flattened near their apex ends to enter the notches of said recesses as the head is assembled, a bolt extending through said head and said conical pivots, an earth leveling tool supported from the free end of said arm, and means supported from said tractor frame for limiting the downward movement of the free end of said leveling tool.

4. The combination of a tractor frame, a steering axle including steering wheels therefor, a bracket detachably secured to the center of said axle, an arm having one end pivotally connected to said bracket and its free end extending forwardly thereof to swing upwardly and downwardly, means carried by said tractor frame for limiting the downward movement of the free end of said arm, a cross arm carried by said arm, means adjustably securing the shank to said cross arm, a convolute spring shank secured to each end of said cross arm, and an earth leveling tool on the lower end of each shank, each tool being supported in front of its corresponding steering wheels.

5. The combination of a tractor frame, a steering axle including steering wheels therefor, a bracket detachably secured to the center of said axle, an arm having one end pivotally connected to said bracket and its free end extending forwardly thereof to swing upwardly and downwardly, means carried by said tractor frame for limiting the downward movement of the free end of said arm, a cross arm carried by said arm, means adjustably securing the shank to said cross arm, a convolute spring shank secured to each end of said cross arm, an earth leveling tool on the lower end of each shank, each tool being supported in front of its corresponding steering wheels, and a shoe supported between said shanks to gage the depth of said leveling tools.

ANDREW E. SUTHERLAND.